(12) United States Patent
Ragot et al.

(10) Patent No.: US 10,489,667 B2
(45) Date of Patent: Nov. 26, 2019

(54) BIOMETRIC IDENTIFICATION METHOD AND DEVICE USING ONE

(71) Applicant: SAFRAN IDENTITY & SECURITY, Issy les Moulineaux (FR)

(72) Inventors: Marcelin Ragot, Issy les Moulineaux (FR); Mael Berthier, Issy les Moulineaux (FR); Yves Bocktaels, Issy les Moulineaux (FR); Julien Bringer, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 68 days.

(21) Appl. No.: 15/388,952

(22) Filed: Dec. 22, 2016

(65) Prior Publication Data

US 2017/0177961 A1 Jun. 22, 2017

(30) Foreign Application Priority Data

Dec. 22, 2015 (FR) ...................................... 15 63046
Mar. 11, 2016 (FR) ...................................... 16 52084

(51) Int. Cl.
*G06K 9/00* (2006.01)
*G06K 9/52* (2006.01)
*G06K 9/62* (2006.01)

(52) U.S. Cl.
CPC ..... *G06K 9/00899* (2013.01); *G06K 9/00087* (2013.01); *G06K 9/00892* (2013.01); *G06K 9/52* (2013.01); *G06K 9/6215* (2013.01)

(58) Field of Classification Search
None
See application file for complete search history.

(56) References Cited

U.S. PATENT DOCUMENTS

| | | | | |
|---|---|---|---|---|
| 7,804,982 | B2 * | 9/2010 | Howard | G06K 9/00248 |
| | | | | 382/115 |
| 8,406,478 | B2 * | 3/2013 | Chen | G06F 21/32 |
| | | | | 340/5.52 |
| 8,417,001 | B2 * | 4/2013 | Niinuma | G06K 9/0012 |
| | | | | 324/658 |
| 8,965,066 | B1 * | 2/2015 | Derakhshani | H04L 9/14 |
| | | | | 382/117 |
| 9,922,234 | B2 * | 3/2018 | Bocktaels | G06K 9/52 |
| 2009/0289761 | A1 | 11/2009 | Janke et al. | |
| 2010/0142764 | A1 * | 6/2010 | Ikegami | G06K 9/00006 |
| | | | | 382/115 |

(Continued)

FOREIGN PATENT DOCUMENTS

| | | | | |
|---|---|---|---|---|
| EP | 2166473 | A2 | 3/2010 | |
| EP | 3051464 | A1 * | 8/2016 | ......... G06K 9/00107 |

(Continued)

*Primary Examiner* — Jayesh A Patel
(74) *Attorney, Agent, or Firm* — Muncy, Geissler, Olds & Lowe, P.C.

(57) ABSTRACT

A biometric identification method includes the steps of comparing a candidate print with a reference print and of validating the identification according to a certain number of characteristics common to both prints and a predetermined validation threshold. The method includes the steps of creating at least one deceiving print and comparing same with a candidate print. An identification device designed for implementing this method is also provided.

17 Claims, 1 Drawing Sheet

(56) References Cited

U.S. PATENT DOCUMENTS

| | | | | |
|---|---|---|---|---|
| 2011/0038012 A1* | 2/2011 | Massicot | ............ | H04N 1/32133 |
| | | | | 358/3.28 |
| 2014/0095885 A1* | 4/2014 | Bringer | ................. | G06F 21/32 |
| | | | | 713/186 |
| 2015/0067344 A1* | 3/2015 | Poder | ................... | G06F 21/316 |
| | | | | 713/176 |
| 2015/0310301 A1* | 10/2015 | Zadeh | ...................... | G06N 7/02 |
| | | | | 382/173 |

FOREIGN PATENT DOCUMENTS

| | | | | |
|---|---|---|---|---|
| EP | 3051464 A1 * | 8/2016 | ......... | G06K 9/00107 |
| WO | WO 2008010773 A1 | 1/2008 | | |

\* cited by examiner

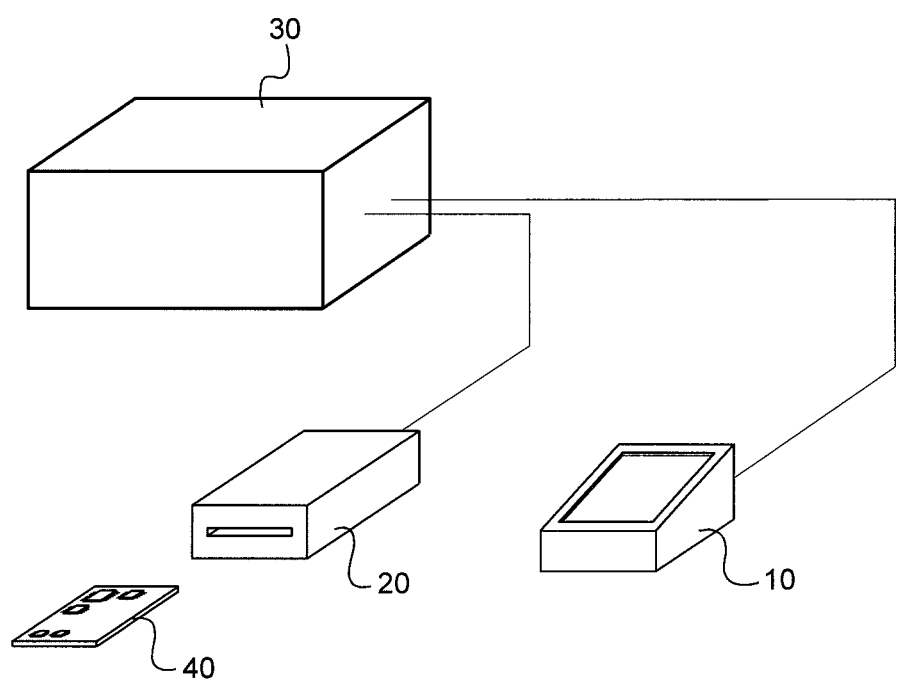

BIOMETRIC IDENTIFICATION METHOD AND DEVICE USING ONE

The present invention relates to the field of biometrics and more particularly to a biometric identification method. In the present document, « print » is used to refer to a set of a person's biometric characteristics, or minutiae, and more particularly a set of biometric characteristics of at least one of his/her fingers, one of his/her palms, a part of his/her venous network, one iris of at least one of his/her eyes, of his/her face, of an ear, or even the characteristics of his/her voice. . . . Such sets of biometric characteristics may be pieces of vectorized images.

STATE OF THE ART

Biometric identification is based on the comparison of a candidate print with a reference print. The reference print is saved in a memory such as the one of an integrated circuit card or a computer server and the comparison is carried out by an integrated circuit (the one on the integrated circuit card or one on the server). The candidate print is captured on the person whose identification is desired. The comparison aims at determining a score of the candidate print according to the similarity between the characteristics of the candidate print and those of the reference print. The identification of the person to be identified is validated when the score of the candidate print is above a predetermined threshold.

Fraud techniques exist, which consist in analysing the power consumption of the integrated circuit, the execution time and the electromagnetic radiation produced during the successive identification operations carried out from the same candidate print which slight modifications have been brought in, from one identification operation to another (such a fraud technique is for example presented in the document Hill-Climbing and Brute-Force: Attacks on Biometric Systems: A Case Study in Match-on-Card Fingerprint Verification—M. Martinez-Diaz, J. Fierrez-Aguilar, F. Alonso-Fernandez, J. Ortega-Garcia, J. A. Siguenza—Proc. IEEE Intl. Carnahan Conf. on Security Techology, ICCST, pp. 151-159, Lexington USA—October 2006). The aim of the analysis of the power supply, the execution time and the electromagnetic radiation of the integrated circuit is to determine the impact of the modifications brought in the candidate print on the parameters analysed and to deduce therefrom the evolution of the score resulting from such modifications. When completed, such analysis, although time-consuming, makes it possible to elaborate a candidate print liable to validate the identification.

OBJECT OF THE INVENTION

One aim of the invention is to supply means for improving the resistance to frauds of the identification methods.

BRIEF SUMMARY OF THE INVENTION

For this purpose, according to the invention, a method of biometric recognition by comparing a candidate print with at least one reference print in order to determine a score according to a similarity of the two prints and one predetermined validation threshold which the score is compared with, is provided for. The method includes the steps of:
capturing a first candidate print;
comparing the first candidate print with the reference print and computing a score of the first candidate print for the reference print;
at least when the score is under the validation threshold, comparing the first candidate print with at least one first deceiving print, with said first deceiving print having been created for having characteristics enabling the first candidate print to obtain a score at least equal to the first predetermined threshold;
computing a score of the first candidate print for the first deceiving print.

The candidate print is usually compared with reference prints only, i.e. prints belonging to known or authorized persons, whose prints have been saved in the memory of the identification system. Now, if the identification algorithm is attacked, the raider cannot be aware that at least one of the prints which the candidate print is compared with is a deceiving print. The first predetermined threshold corresponds to the score that a candidate print relatively similar to the deceiving print would reach. If the raider manages to detect the scores, he/she will know that the candidate print he/she presented has a relatively interesting score with one of the reference prints, whereas said score has been computed from the deceiving print. This will thus mislead the raider and complicate the algorithm job analysis.

The method advantageously comprises the steps of:
capturing a second candidate print;
comparing the second candidate print with the reference print and computing a score of the second candidate print for the reference print;
comparing the second candidate print with the first deceiving print and computing a score of the second candidate print for the first deceiving print;
if the score is under the validation threshold for the reference print and under the first predetermined threshold for the first deceiving print, generating a second deceiving print to have characteristics enabling the second candidate print to obtain a score at least equal to the first predetermined threshold.

Thus, when the attack consists in successive presentations of mutually slightly different candidate prints (an attack currently called « hill climbing » ), the identification algorithm of the invention is so designed as to still be able to compare the candidate print with a very similar deceiving print, whether such deceiving print has been generated for a previous candidate print but very similar to the candidate print currently processed or specifically generated for the currently processed candidate print. The raider can only know that one of the scores is favourable, but not that it has been computed relative to a deceiving print. The print thus created by the raider will not enable him/her to complete identification.

The invention also relates to an identification device for implementing this method.

Other characteristics and advantages of the invention will become apparent upon reading the following description of particular non-restrictive embodiments of the invention.

BRIEF DESCRIPTION OF THE DRAWINGS

Reference will be made to the sole FIGURE appended herewith, which schematically shows an identification device for implementing the method of the invention.

DETAILED DESCRIPTION OF THE INVENTION

The invention is disclosed here for an application to a biometric identification based on a fingerprint. The invention is of course applicable to any biometrics and may, for instance, concern the characteristics of the iris of at least one eye, the characteristics of a venous network, the characteristics of a face or of an ear, the characteristics of a voice. . . .

Referring to the FIGURE, the method of the invention is here implemented using an identification device comprising: at least one fingerprint capture device 10; an integrated circuit card reader 20; a computer unit 30 connected to the capture device 10 and to the reader 20; and at least one integrated circuit card 40. The fingerprint capture device 10 comprises an optical sensor here, but other technologies can be used. Here the reader 20 is a contact type reader. The computer unit 30 here comprises a processor and memories and is so designed as to execute a first programme implementing the method of the invention.

The integrated circuit of the integrated circuit card 40 comprises a processor and a memory for executing a second programme implementing the method of the invention, using a processing and print comparison algorithm (which is called a « matching » programme hereunder). The integrated circuit card 40 is handed over to a person using the device. The card memory also contains characteristics of a reference print consisting of a fingerprint belonging to the user who received the integrated circuit card 40, and, optionally, the user's identification, such as his/her name, and rights related to the user, such as the right to enter some places, or access some files, documents or information. . . .

An enlistment operation, known per se, is carried out prior to the implementation of the identification method, during which:

biometric characteristics of a user's reference print are retrieved from an image captured by the fingerprint capture device 10;

such biometric characteristics of the reference print are saved in the memory of the integrated circuit of the integrated circuit card.

Besides, two deceiving prints L1, L2 are randomly generated and are saved at locations M1, M2 of the memory of the integrated circuit of the integrated circuit card respectively (the references L1, L2, M1, M2 are not used as reference numbers written in the FIGURES, but simply to facilitate the identification of such elements in the following of the description, and other references of the same type are used in the following, for this purpose). The reference print and the deceiving prints are saved in the same memory space. Predetermined biometric characteristics have been added to the random deceiving prints and form a combination which does not exist in the reference print. Thus, deceiving prints comprise predetermined biometric characteristics enabling the deceiving prints to be identified and distinguished from the reference print.

The biometric identification method according to the invention starts with the steps of:

capturing biometric characteristics of a candidate print C1 on the same finger of an identification seeker;

transmitting same to the integrated circuit of the card which implements the « matching » algorithm.

Such steps are executed by the computer unit 30 controlling the fingerprint capture device 10 and the integrated circuit card reader 20.

The « matching » method comprises the following steps of:

aligning the biometric characteristics of the candidate print C1 so that the candidate print C1 is oriented and centered as the reference print is;

comparing the biometric characteristics of the candidate print C1 with the stored biometric characteristics of the reference print;

computing a score of the candidate print according to a certain number of characteristics common to both prints.

The comparison of the biometric characteristics of the prints is carried out while trying to match each biometric characteristic of the candidate print C1 with one of the biometric characteristics of the reference print. The score is computed according to the completed matchings, i.e. according to the similarity of the characteristics of the candidate print C1 with those of the reference print. It should be noted that the matching and score computing operations are known per se and shall not be disclosed in greater details here.

According to the invention, the method comprises the subsequent steps of:

comparing, as above mentioned, the candidate print C1 with each one of the deceiving prints L1, L2;

computing a score of the candidate print C2 for the deceiving print L2'.

If none of the scores obtained with the deceiving prints is above a first predetermined threshold S1 under a validation threshold SV, the algorithm modifies one of the random prints L1, L2, for instance, here L1, so that the candidate print C1 gets a score between the first predetermined threshold S1 and a predetermined threshold S2, both under the validation threshold SV. The modified deceiving print, referred to as L1', is saved again at location M1, at the place of the deceiving print L1. The modification consists in adding characteristics of the candidate print C1 into the deceiving print L1.

The validation threshold is equal to the score from which two prints are considered as identical. The first predetermined threshold S1 is so determined as to correspond to a relative similarity of the deceiving print L1' with the candidate print C1 without the two prints being in a position to be considered as identical. The second predetermined threshold S2 is a warning threshold under the validation threshold SV and the function of which will be explained in the following.

Upon completion of the validation operation, the scores are all compared with the validation threshold SV. Then, either the score of the candidate print C1 with the reference print has reached the validation threshold and the identification is validated, or the score of the candidate print C1 with the reference print is under the validation threshold and the identification is rejected.

If a second identification is attempted subsequently, the method comprises the steps of:

capturing a second candidate print C2;

comparing the candidate print C2 with the reference print and computing a score of the candidate print C2 for the reference print;

comparing the candidate print C2 with the deceiving prints L1', L2 and computing a score of the candidate print with each deceiving print.

If the candidate print C2 is a candidate print made up by a fraudster from the candidate print C1 to attempt attacking the identification algorithm, the candidate print C2 will be only slightly different from the candidate print C1 and thus will be very similar to the candidate print C1. The score of the print C2 will thus probably be between the predetermined thresholds S1 and S2 for the deceiving print L1', and no deceiving print will be recreated or modified.

The algorithm then goes on with comparing all the scores obtained at the validation threshold SV to validate or reject the identification.

If the score of the print C2 reaches the second predetermined threshold S2 for the deceiving print L1', the method implemented by the algorithm comprises the step of triggering a securing action. The securing action comprises the step of modifying the deceiving print L1' for which the candidate print C2 has a score above the second predetermined threshold S2 so as to form a deceiving print L1" for which the score of the candidate print C2 will be between the predetermined thresholds S1 and S2. If a score has to be returned by the algorithm, then the score obtained when comparing C1 with L1' is returned.

The algorithm then goes on with comparing all the scores obtained at the validation threshold SV to validate or reject the identification.

If, on the contrary, the candidate print C2 has nothing to do with the candidate print C1, the score of the candidate print C2 is most probably under the first predetermined threshold for both deceiving prints L1', L2, the method comprises the steps of:

modifying the older deceiving print, here the deceiving print L2, so as to generate a deceiving print L2' having characteristics enabling the deceiving print C2 to have a score between the predetermined thresholds S1 and S2;

saving the deceiving print L2' into the memory space M2 at the place of the deceiving print L2;

computing a score of the candidate print C2 for the deceiving print L2'.

The algorithm then goes on with comparing all the scores obtained at the validation threshold SV to validate or reject the identification.

The same operations are carried out for each subsequent attempted identification:

if the new candidate print obtains a score above the first threshold for one of the deceiving prints, no deceiving print is modified, if the new candidate print obtains a score under the first threshold for both deceiving prints, the older deceiving print is modified and erased.

It should be noted that having two deceiving prints enables the identification algorithm to resist two parallel attacks through successive presentations of very similar candidate prints (the prints of the two attacks are presented alternately).

To make sure that the time required for executing the algorithm appears as constant as possible, whatever the candidate print, making a new comparison and computing a score of the candidate print with one of the stored prints or with the reference print and both deceiving prints can be considered.

To this end, it is possible to create a dummy deceiving print when the candidate print obtains a score above the validation threshold for the reference print or above the first predetermined threshold for one of the deceiving prints; The candidate print is then compared to the dummy deceiving print and a score is computed for such dummy deceiving print. The dummy deceiving print needs not be saved in the memory. However, to maintain the identification time constant, simulating the writing of the dummy deceiving print into the memory or actually saving the dummy deceiving print, for instance at the place of an unused deceiving print, is preferable.

Of course, the invention is not limited to the described embodiments but encompasses any alternative solution within the scope of the invention as defined in the claims.

More particularly, using one or more than two deceiving prints is possible, depending on the size of the memory used to store the deceiving prints.

Not erasing the older deceiving print, and instead writing the new deceiving print into a free memory space, insofar as such space exists, may be considered. An optimized space assigned to the saving of deceiving prints is then provided for. The increase in the identification time, resulting from the increase in the number of deceiving prints then has to be limited, or offset.

The initially saved deceiving prints may be identical or different.

Several reference prints may be stored in the memory.

The deceiving prints may be saved in a memory space different from the one where the reference print has been saved, so as to easily make the difference therebetween.

The deceiving prints may be associated with an identifier making it possible to distinguish same from the reference prints.

The deceiving prints may be complete prints or partial prints.

The thresholds used may be identical or not, for the deceiving prints.

The securing action may be different from the one disclosed and for instance comprise the step of aborting the identification or prompting an operator to enter a code, or more generally, as the system integrator chooses, (for instance, on a printed circuit card, making the decision of deactivating the card).

The deceiving print may be generated to have characteristics enabling the candidate print to have a score above the first threshold only, or between the first predetermined threshold and the validation threshold.

In an alternative solution, using a second predetermined threshold is optional. Securing can be triggered after counting the number of comparisons between a candidate print and the same deceiving print and comparison of the number of comparisons with a third predetermined threshold.

In a less secure alternative solution, only the score obtained with the reference print can be compared with the validation threshold.

Another less secure alternative solution may decide, so that the authorized candidates will not waste time, to use the deceiving prints only when the score of the candidate print is under the validation threshold for the reference print. It is expected that the fraudster does not have an authorized candidate print, and that he/she will not notice the difference in the duration of the print processing.

If it is possible to reduce the emissions of interferences when implementing the method of the invention (symmetrization of some operations, preservation of a constant time of execution of a phase whatever the number of operations carried out during such phase, introduction of random components during the execution of the method. . . .), this will be done only (since it is desired to preserve a more or less hidden weakness for comparing the spoof prints) during the steps of comparison of the candidate print with the reference print and of computing the corresponding score.

It should be noted that the order of comparison of the candidate print with the reference prints and the deceiving prints can be changed, from one candidate print to another.

The biometric characteristics may be directly supplied by a reading device or through biometric capture, or be transferred from a database, or captured, for instance.

Various matching methods may be used and for instance the one called MCC (for « Minutia Cylinder Code » ) or the one disclosed in the following publications:

IEEE Transactions on Pattern Analysis and Machine Intelligence (Volume 28, Issue: 12), pages 2037-2041, December 2006, ISSN 0162-8828, 10.1109/TPAMI.2006.244;

IEEE Transactions on Pattern Analysis and Machine Intelligence (Volume 32, Issue: 12) Biometrics Compendium, IEEE, pages 2128-2141, & 8 Mar. 2010, ISSN 0&62-8828, DOI 10.1109/TPAMI.2010.52.

"Print" here is used to refer to a set of a person's biometric characteristics, and so the invention is in no way limited to an application to fingerprints.

The invention may be applied to stationary systems comprising a server and print capture terminals, or systems embedded in mobile telecommunication terminals such as laptop computers or cellular phones like smartphones, for instance. The server and/or the capture terminals, or the embedded systems comprise an electronic unit so designed as to implement the method of the invention.

The method may advantageously comprise a step of configuring, during which a securing action is selected from a list of predetermined securing actions.

The method may advantageously comprise a step of configuring during which at least one deceiving print is saved beforehand, with the deceiving print being a random print.

A deceiving print is a print, or more exactly a « template » which comprises minutiae or characteristic points which are iteratively improved by successive presentations to the comparison algorithm against a target print, so as to keep, through the iterations, an increasing lot of predetermined characteristics selected according to a comparison score above the score obtained during the preceding iteration. The previously saved deceiving print may be an unauthorized authentic print, a print the minutiae of which have been randomly generated or the minutiae of which have been so selected and are in a sufficient number as to group the most frequent, or on the contrary, the less frequent minutiae, for instance. The modifications made may comprise modifying the type of the minutia, adding minutiae, removing minutiae, displacing minutiae. . . .

In an alternative solution, the first candidate print is compared with the first deceiving print and a score of the first candidate print is computed for the first deceiving print, even though the score of the first candidate print is at least equal to the validation threshold for the reference print.

In another alternative solution, the generated deceiving print has been generated and has been saved in place of the existing deceiving print after the candidate print has been compared with the reference print and with the existing deceiving print, with the score obtained with the reference print being under the validation threshold and the score obtained with the existing deceiving print being under the first predetermined threshold.

The invention claimed is:

1. A method for biometric identification implemented by a computer unit by comparing a candidate print with at least one reference print for determining a score depending on the similarity of the candidate print and the at least one reference print and a predetermined validation threshold which the score will be compared with, the method comprising the following steps:
    capturing a first candidate print;
    comparing the first candidate print with the at least one reference print and computing a score of the first candidate print for the at least one reference print;
    at least when the score of the first candidate print for the at least one reference print is under the predetermined validation threshold, comparing the first candidate print with at least one first deceiving print, with said at least one first deceiving print having been created for having biometric characteristics enabling the first candidate print to obtain a score for the at least one first deceiving print at least equal to a first predetermined threshold; and
    computing the score of the first candidate print for the at least one first deceiving print, the biometric identification being validated if the score of the candidate print for the at least one reference print has reached the predetermined validation threshold, and the biometric identification being rejected if the score of the candidate print for the at least one reference print is under the predetermined validation threshold.

2. The method according to claim 1, which comprises the following steps:
    capturing a second candidate print;
    comparing the second candidate print with the at least one reference print and computing a score of the second candidate print for the at least one reference print;
    comparing the second candidate print with the at least one first deceiving print and computing a score of the second candidate print for the at least one first deceiving print; and
    if the score of the second candidate print for the at least one first deceiving print is under the predetermined validation threshold for the at least one reference print and under the first predetermined threshold for the at least one first deceiving print, generating a second deceiving print to have biometric characteristics enabling the second candidate print to obtain a score for the second deceiving print at least equal to the first predetermined threshold.

3. The method according to claim 2, comprising the step of computing a score of the second candidate print for the second deceiving print.

4. The method according to claim 1, wherein, when the candidate print obtains a score above the first predetermined threshold with the at least one first deceiving print, the method comprises the step of triggering a securing action when the score is also above a second predetermined threshold above the first predetermined threshold.

5. The method according to claim 4, wherein the second predetermined threshold is between the first predetermined threshold and the predetermined validation threshold.

6. The method according to claim 4, wherein the securing action comprises the step of modifying the at least one first deceiving print for which the candidate print has a score above the second predetermined threshold.

7. The method according to claim 4, wherein the securing action comprises the step of aborting the identification.

8. The method according to claim 4, wherein the securing action is selected from a list of predetermined securing actions.

9. The method according to claim 2, wherein the generated second deceiving print is generated and saved in a place of an existing deceiving print after the candidate print has been compared with the at least one reference print and with the existing deceiving print, with the score obtained with the at least one reference print being under the predetermined validation threshold and the score obtained with the existing deceiving print being under the first predetermined threshold.

10. The method according to claim 9, wherein at least one deceiving print is saved beforehand, with the at least one deceiving print being a random print.

11. The method according to claim 1, wherein the first candidate print is compared with the at least one first deceiving print and a score of the first candidate print is computed for the at least one first deceiving print, even though the score of the first candidate print is at least equal to the predetermined validation threshold for the at least one reference print.

12. The method according to claim 1, wherein the at least one reference print and said at least one first deceiving print are saved in a same memory space, with the at least one first deceiving print comprising biometric characteristics so predetermined as to identify and distinguish the at least one first deceiving print from the at least one reference print.

13. The method according to claim 1, comprising the steps of:
creating a dummy deceiving print when the candidate print obtains a score above the predetermined validation threshold for the at least one reference print or above the first predetermined threshold for one of the at least one first deceiving print;
comparing the candidate print with the dummy deceiving print; and
computing a score for the dummy deceiving print.

14. The method according to claim 13, comprising the step of saving the dummy deceiving print into a memory.

15. The method according to claim 13, comprising the step of simulating the writing of the dummy deceiving print into the memory.

16. The method according to claim 1, wherein the at least one first deceiving print has been generated to have biometric characteristics enabling the candidate print to obtain a score between the first predetermined threshold and the predetermined validation threshold.

17. A device for biometric identification comprising at least one print capture device and a computer unit connected to the capture device, with the computer unit configured to implement the method according to claim 1.

* * * * *